Nov. 16, 1965 C. R. DOAK 3,218,091
HOUSE TRAILER SKIRTS
Filed Jan. 8, 1964 2 Sheets-Sheet 1
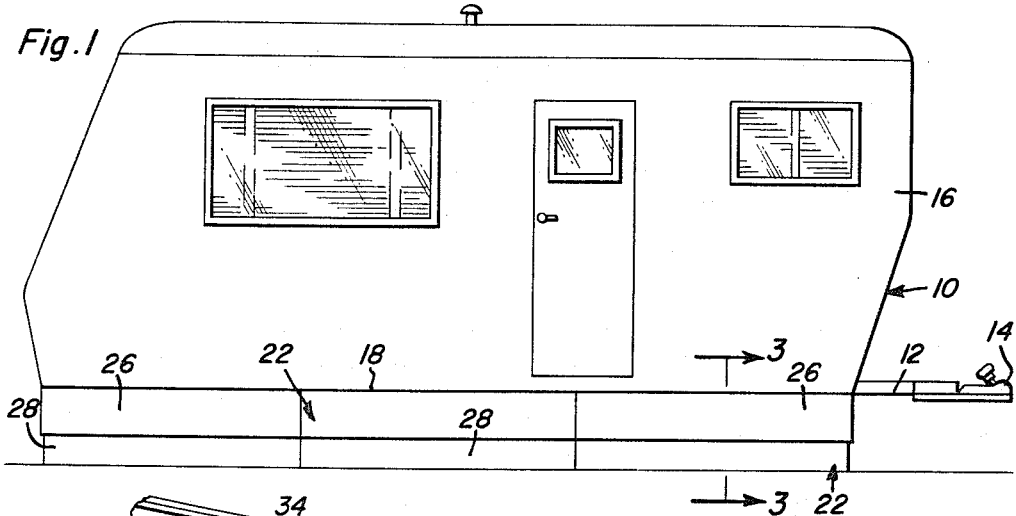
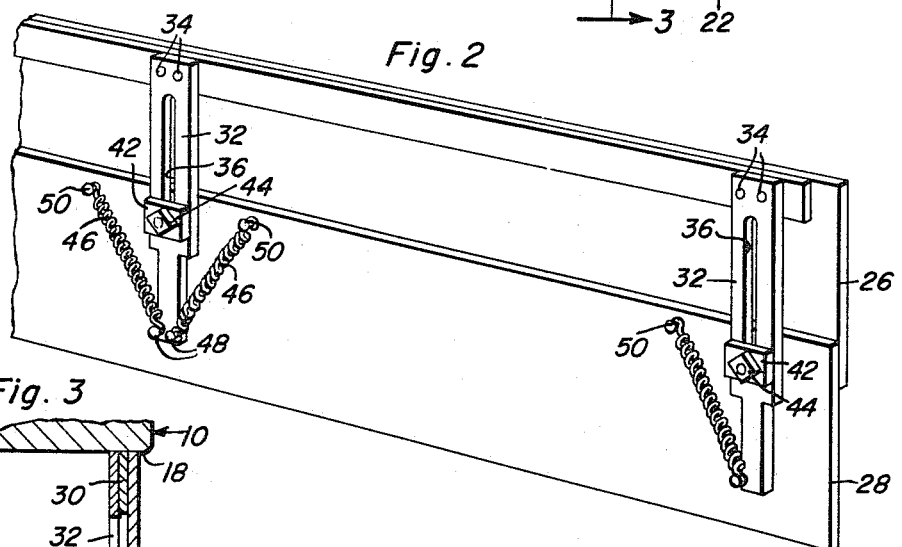
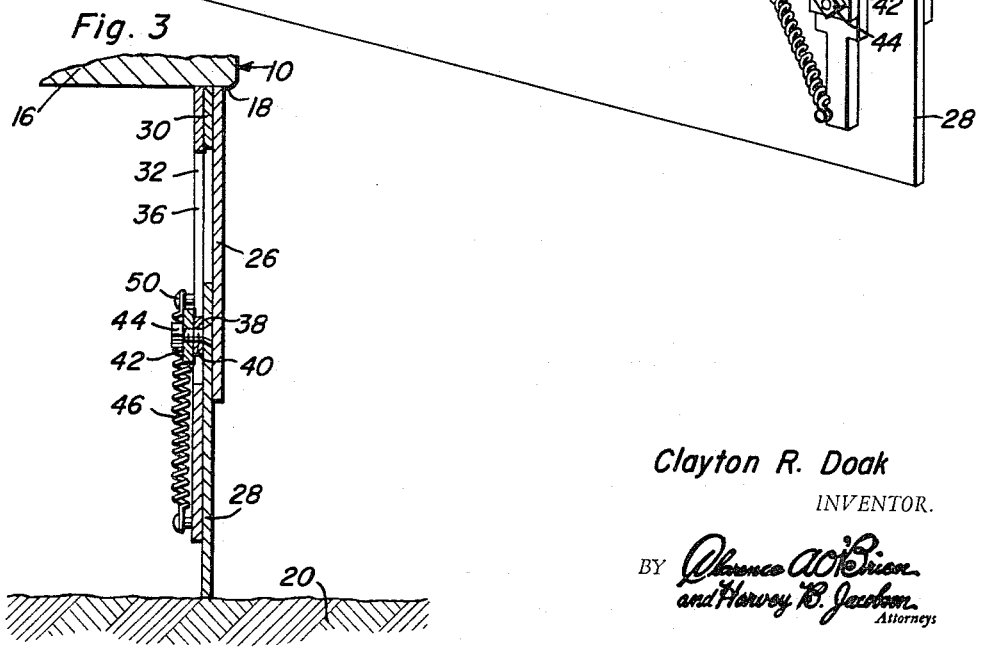
Clayton R. Doak
INVENTOR.

Nov. 16, 1965  C. R. DOAK  3,218,091
HOUSE TRAILER SKIRTS
Filed Jan. 8, 1964  2 Sheets-Sheet 2

Clayton R. Doak
INVENTOR.

BY *Clarence A. O'Brien*
*and Harvey B. Jacobson*
Attorneys

United States Patent Office 3,218,091
Patented Nov. 16, 1965

3,218,091
HOUSE TRAILER SKIRTS
Clayton R. Doak, Fernley, Nev.
(P.O. Box 358, Kines Beach, Calif.)
Filed Jan. 8, 1964, Ser. No. 336,583
1 Claim. (Cl. 280—150)

This invention relates to a novel and useful house trailer skirt assembly and more specifically to a collapsible panel assembly which is specifically adapted to provide a skirt around the base of a mobile house trailer and the like.

While many types of house trailer skirts have heretofore been designed, most of these have been at least semi-permanently secured to the house trailer and have been constructed in a manner whereby they are visible even when in the retracted position. In addition, while some prior type of house trailer skirts have been constructed so as to be readily detached from the house trailer, their design necessitates that they be semi-permanently secured to the house trailer each time their use is desired.

The house trailer skirt assembly of the instant invention is constructed in a manner whereby the skirt may be readily erected so as to form a panel-like construction between the lower portion of a house trailer and the ground on which the house trailer rests. In addition, the skirts of the instant invention are constructed in a manner whereby they do not require any particular mounting on the house trailer before they can be used and in a manner whereby they may be operative even though the ground on which the house trailer rests is uneven.

The main object of this invention is to provide a house trailer skirt assembly for forming an enclosure about the area immediately below the frame of a house trailer in order that drafts underneath the house trailer may be excluded, the appearance of the house trailer may be improved upon, and a closed storage area may be formed.

Another object of this invention, in accordance with the immediately preceding object, is to provide a house trailer skirt assembly constructed in a manner whereby it does not require any form of attachment of the skirt assembly to the house trailer in order to erect the skirt assembly.

A further object of this invention is to provide a house trailer skirt assembly constructed in a manner whereby individual sections thereof may be readily removed so as to provide access to the normally closed storage area formed thereby about the base of the associated house trailer.

A further object of this invention is to provide a skirt assembly which is vertically adjustable and which therefore may be utilized to provide a skirt about a house trailer even though the house trailer is resting on uneven ground.

A final object of this invention to be specifically enumerated herein is to provide a house trailer skirt assembly which will conform to conventional forms of manufacture, be of simple construction and easy to use so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a conventional form of house trailer shown with the house trailer skirt assembly of the instant invention operatively associated therewith;

FIGURE 2 is a fragmentary enlarged perspective view of the house trailer skirt assembly of the instant invention;

FIGURE 3 is a fragmentary transverse vertical sectional view taken substantially upon a plane indicated by the section line 3—3 of FIGURE 1 and on somewhat of an enlarged scale;

Figure 4:
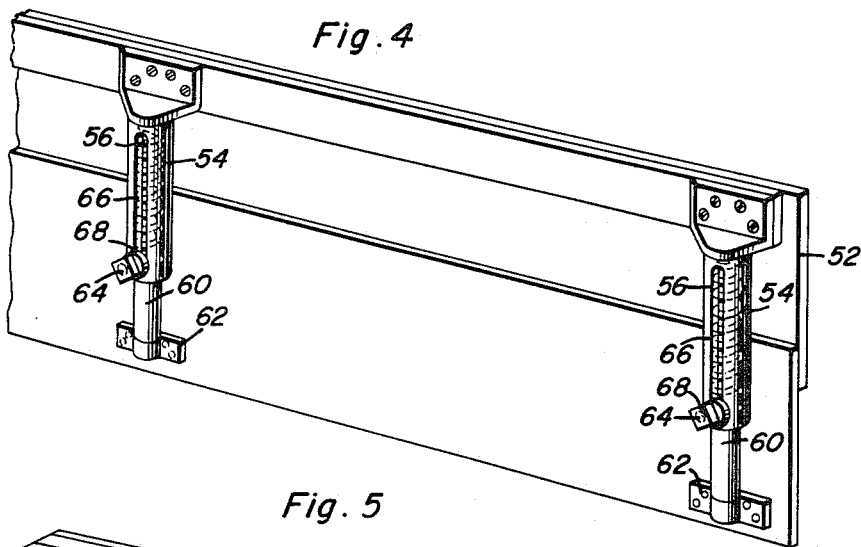
FIGURE 4 is a fragmentary enlarged perspective view of a modified form of house trailer skirt assembly.

Referring now more specifically to the drawings the numeral 10 generally designates a conventional form of house trailer which includes a forwardly projecting tongue 12 having a ball-socket hitch element 14 on its forward end.

The trailer 10 includes a body 16 which terminates at its lower end along a generally horizontal edge 18. It may be seen from FIGURES 1 and 3 of the drawings that the lowermost edge 18 of the trailer 10 is spaced a distance above the ground 20 and therefore that there is normally a relatively large unenclosed area beneath a house trailer.

The house trailer skirt assembly of the instant invention is generally designated by the reference numeral 22 and comprises a skirt section which, when utilized in groups of assemblies and arranged as shown in FIGURE 1 of the drawings provide a means whereby the usually open area beneath a house trailer may be enclosed.

The trailer skirt assembly 22 comprises a first elongated base panel member 26 and a second elongated extendable panel member 28. The panel member 26 has an elongated spacing and abutment member 30 secured along one longitudinal marginal edge portion thereof.

The panel members 26 and 28 are disposed in side-by-side relation and with their adjacent surfaces in sliding contacting relation with each other. The one marginal edge portion to which the spacing and abutment member 30 is secured projects outwardly beyond the corresponding edge portion of the panel member 28.

Guide means in the form of a pair of elongated arms 32 are secured to the spacing and abutment member 30 in any convenient manner such as by fasteners 34. The arms 32 generally parallel each other and the base panel 26 and project toward and pass the longitudinal edge portion thereof remote from the spacing and abutment member 30.

The base panel 26, the spacing and abutment member 30, and the arms 32 define a channel in which the extendable panel member 28 is received and laterally shiftable. Each of the arms 32 is provided with a longitudinal slot 36 and the extendable panel member 28 includes a plurality of laterally projecting studs 38 on which a plurality of apertured slide members 40 are mounted. The studs 38 project through the corresponding slots 36 and the slide members 40 are slidably received in the slots 36. A backing plate 42 is secured over the back of each arm 32 by means of a fastener 44 which is threadedly engaged with the free end of each stud 38. Further, the lower end of each of the arms 32 has one end of an expansion spring 46 secured thereto as at 48 while the other end of the expansion spring is secured to the overlapped edge portion of the extendable panel member 28 as at 50.

It is to be noted that the skirt assembly 22 may be readily collapsed and retained in a collapsed position by loosening the fasteners at 44 and then urging the panel members 26 and 28 toward their overlapped positions with the extendable panel member 28 abutting against the spacing and abutment member 30. Then, the fasteners 44 may be tightened in order to retain the skirt assembly 22 in the collapsed position. However, when it is desired to erect the skirt assembly 22 between the trailer 10 and the ground 20, it is necessary only to loosen the nuts 44 and to place the assembly 22 between the ground 20 and the lower portion 18 of the trailer 10 whereupon the springs 46 will urge the panel member 26 to the extended position and its free edge will engage the bottom edge 18 of the body 16 and the remote longitudinal edge of the panel member 28 will engage the ground 20. The springs 46 will, of course, be of sufficient strength to maintain the skirt assembly 22 in an upright position between the channel body 16 and the ground 20.

With attention now drawn to FIGURE 4 of the drawings there will be seen a modified form of skirt assembly generally referred to by the reference numeral 52 which is similar to the skirt assembly 22 but whose guide arms 54 are tubular and provided with longitudinal slots 56. Instead of being provided with studs the extendable panel member 58 of the skirt assembly 54 has a plurality of cylindrical arms 60 secured thereto in any convenient manner such as by base plates 62 and each of the arms 60 is telescopically received within the free end of the associated arm 54. Each of the arms 60 does include a laterally directed stud 64 which is slidingly received and secured through a corresponding slot 56. In addition, each of the arm members 54 has a compression spring 66 disposed therein between the telescoped end of the corresponding arm 60 and the corresponding end thereof. The operation of the skirt assembly 52 is substantially identical to the operation of the skirt assembly 22. The threaded fasteners 68 secured to the studs 64 may be loosened before the skirt assembly 52 is installed whereupon the springs 66 will urge the panel member 58 to the extended position. When it is desired to collapse the skirt assembly 52, the panel member 58 is urged to the collapsed position and secured therein by means of the fasteners 68.

Figure 5:
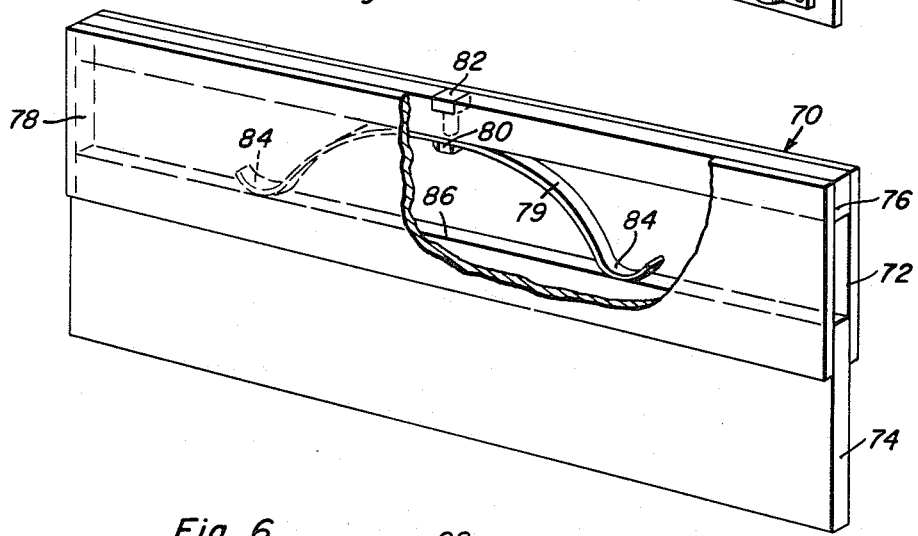
FIGURE 5 is a perspective view of a still further modified form of house trailer skirt assembly shown with parts thereof being broken away and in section.

In FIGURE 5 there is illustrated a further modified form of skirt assembly generally referred to by the reference numeral 70 and which includes a base panel member 72, an extendable panel member 74, and an elongated spacing and abutment member 76. While the skirt assembly 70 includes guide means which generally parallels the base panel member 72, the guide means is in the form of a third panel member 78. There is, of course, a channel formed between the panel members 72 and 78 and the spacing and abutment member 76 and the extendable panel member 74 is snugly received in this channel.

A bowed leaf spring 79 is disposed within the channel formed between the panel members 72 and 78 and has its mid-portion 80 secured to the spacing and abutment member 76 in any convenient manner such as by fasteners 82. The opposite end portions of the leaf spring 79 are reversely curved as at 84 and engage the telescoped longitudinal marginal edge portion 86 of the extendable panel 84 to normally urge the latter toward the extended position illustrated in FIGURE 5 of the drawings.

The operation of the skirt assembly 7 is substantially the same as the operation of the skirt assemblies 22 and 52 with the exception that the spring 79 always yieldingly urges the extendable panel 74 toward the extended position, there being no means for releasably retaining the extendable panel member 74 in the retracted position.

Figure 6:
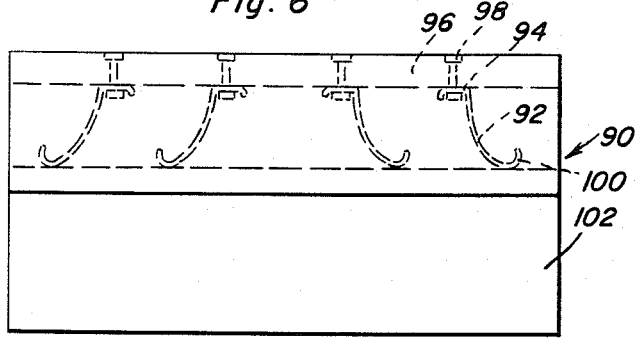
FIGURE 6 is a side elevational view of a still further modified form of house trailer skirt assembly constructed in accordance with the present invention.

With attention now directed to FIGURE 6 of the drawings there will be seen yet another modified form of skirt assembly generally referred to by the reference numeral 90 and which is identical in all respects to the skirt assembly 70 with the exception of the spring means thereof. The skirt assembly 90 includes pairs of half-leaf springs 92 each having one end portion 94 secured to the spacing and abutment member 96 by means of a fastener 98 and the other end 100 engaged with the adjacent marginal edge portion of the extendable panel member 102.

It will be noted that the skirt assemblies include at least one side that is clean and without projections or accessory hardware. It is this side of each assembly that is to be disposed to the outside as shown in FIGURE 1 of the drawings. In this manner, the area disposed beneath the body 16 may be fully enclosed in an attractive manner and with a minimum amount of effort.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:

In combination with a house trailer including a generally horizontally disposed peripheral undersurface spaced above a supporting surface for said trailer, a house trailer skirt assembly comprising a first upper horizontally elongated base panel member and a second lower horizontally elongated extendable panel member, said panel members being disposed in side-by-side relation with the lower and upper longitudinal marginal edge portions of said base and extendable panel members, respectively, disposed in overlapped relation, the upper marginal edge portion of said base panel member including spacing and abutment means projecting inwardly from the side thereof adjacent said extendable panel member and engageable with the latter, guide means secured to said spacing and abutment means generally paralleling said base panel member and extending toward the lower longitudinal marginal edge portion of said base panel member defining a channel bound by said guide means, said spacing and abutment means and said base panel member in which said extendable panel member is received and laterally shiftable, means connected between said panel members yieldingly urging said extendable panel member away from said spacing and abutment means toward a position with its lower longitudinal edge portion thereof projecting outwardly of said channel beyond the lower marginal edge portion of said base panel member, said assembly being disposed and extending between said undersurface and said supporting surface with the upper and lower marginal edge portions, respectively, of said base and extendable panel members abuttingly and removably engaged therewith, said guide means comprising a pair of generally parallel elongated arm members secured to said spacing and abutment means at one pair of corresponding ends and projecting beyond the lower marginal edge portion of said base panel member, said arm members having longitudinal slots formed therein with closed ends spaced above the lower ends of said arm members, said extendable panel member including a pair of laterally projecting members slidingly received in the corresponding slots, said urging means comprising expansion springs secured between the upper marginal edge portion of said extendable panel member and the lower ends of said arm members.

References Cited by the Examiner

UNITED STATES PATENTS 1,009,879  11/1911  Ackerman _____ 20—68
1,341,008  5/1920  Brown _____ 280—156

(Other references on following page)

UNITED STATES PATENTS

| | | | |
|---|---|---|---|
| 1,617,316 | 2/1927 | Abrams | 160—224 |
| 1,756,030 | 4/1930 | Kownatzky | 160—224 |
| 1,808,199 | 6/1931 | Abrams | 160—224 |
| 2,555,244 | 5/1951 | Pietrushak | 20—68 |
| 2,575,459 | 11/1951 | Moten | 20—68 |
| 2,903,758 | 9/1959 | Hayman | 20—68 |
| 2,988,380 | 6/1961 | Puckett | 280—150 |
| 3,030,674 | 4/1962 | Kapaun | 20—68 |
| 3,042,425 | 7/1962 | Cathey | 280—150 |
| 3,106,411 | 10/1963 | Holmes | 280—150 |
| 3,113,357 | 12/1963 | Reukauf | 280—150 X |

FOREIGN PATENTS

| | | |
|---|---|---|
| 893,490 | 4/1962 | Great Britain. |

BENJAMIN HERSH, *Primary Examiner*.

LEO FRIAGLIA, *Examiner*.